United States Patent
Merry, Jr. et al.

(10) Patent No.: US 8,151,020 B2
(45) Date of Patent: *Apr. 3, 2012

(54) STORAGE SUBSYSTEM WITH CONFIGURABLE BUFFER

(75) Inventors: David E. Merry, Jr., Irvine, CA (US); Mark S. Diggs, Laguna Hills, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/566,453

(22) Filed: Sep. 24, 2009

(65) Prior Publication Data
US 2010/0017542 A1    Jan. 21, 2010

Related U.S. Application Data

(63) Continuation of application No. 11/672,435, filed on Feb. 7, 2007, now Pat. No. 7,596,643.

(51) Int. Cl.
*G06F 3/00* (2006.01)
*G06F 5/00* (2006.01)
(52) U.S. Cl. .............. 710/56; 710/15; 710/17; 710/52
(58) Field of Classification Search .............. 710/56
See application file for complete search history.

(56) References Cited

U.S. PATENT DOCUMENTS

| | | | |
|---|---|---|---|
| 4,296,464 A | 10/1981 | Woods | |
| 5,442,768 A | 8/1995 | Sudoh et al. | |
| 5,737,563 A | 4/1998 | Shigeeda | |
| 5,768,612 A | 6/1998 | Nelson | |
| 5,784,698 A | 7/1998 | Brady et al. | |
| 5,890,219 A | 3/1999 | Scaringella et al. | |
| 6,000,006 A | 12/1999 | Bruce et al. | |
| 6,014,727 A * | 1/2000 | Creemer | 711/118 |
| 6,081,878 A | 6/2000 | Estakhri et al. | |
| 6,088,765 A | 7/2000 | Ohtsuka | |
| 6,092,095 A * | 7/2000 | Maytal | 718/100 |

(Continued)

FOREIGN PATENT DOCUMENTS
EP    0 589 597 A3    3/1994

OTHER PUBLICATIONS

Document explaining prior sale.

(Continued)

*Primary Examiner* — Henry Tsai
*Assistant Examiner* — Kris Rhu
(74) *Attorney, Agent, or Firm* — Knobbe Martens Olson & Bear LLP

(57) ABSTRACT

A storage subsystem includes a variable-size write buffer that temporarily stores write data received from a host system. The storage subsystem is capable of adjusting the size of the write buffer so as to vary both the performance (e.g., sustained write speed) of the storage subsystem and a risk of data loss. In one embodiment, the storage subsystem implements a command set that enables the host system to directly control the size of the write buffer. The storage subsystem may additionally or alternatively be capable of adjusting the size of the write buffer based on monitored operating conditions, such as the temperature, the stability/consistency of a power signal received from the host system, and/or the elapsed time since the storage subsystem was last powered up.

20 Claims, 3 Drawing Sheets

U.S. PATENT DOCUMENTS

| | | | |
|---|---|---|---|
| 6,269,434 B1 | 7/2001 | Tanaka | |
| 6,272,589 B1* | 8/2001 | Aoki | 711/112 |
| 6,401,214 B1 | 6/2002 | Li | |
| 6,434,648 B1 | 8/2002 | Assour et al. | |
| 6,452,950 B1* | 9/2002 | Ohlsson et al. | 370/516 |
| 6,530,034 B1 | 3/2003 | Okada et al. | |
| 6,546,456 B1* | 4/2003 | Smith et al. | 711/112 |
| 6,564,173 B1 | 5/2003 | Arntz et al. | |
| 6,675,281 B1 | 1/2004 | Oh et al. | |
| 6,704,012 B1 | 3/2004 | Lefave | |
| 6,732,221 B2 | 5/2004 | Ban | |
| 6,754,765 B1 | 6/2004 | Chang et al. | |
| 6,761,580 B2 | 7/2004 | Chang | |
| 6,871,272 B2 | 3/2005 | Butterworth | |
| 6,892,248 B2 | 5/2005 | Thayer | |
| 6,944,063 B2 | 9/2005 | Chen et al. | |
| 6,944,717 B2 | 9/2005 | Yoneyama et al. | |
| 6,976,190 B1 | 12/2005 | Goldstone | |
| 6,996,623 B1* | 2/2006 | Kawano et al. | 709/231 |
| 7,054,986 B2 | 5/2006 | Zhao et al. | |
| 7,079,395 B2 | 7/2006 | Garnett et al. | |
| 7,262,961 B2 | 8/2007 | Motoe et al. | |
| 7,277,978 B2 | 10/2007 | Khatami et al. | |
| 7,447,944 B2 | 11/2008 | Hu | |
| 7,464,306 B1 | 12/2008 | Furuhjelm et al. | |
| 7,694,188 B2 | 4/2010 | Raghuraman et al. | |
| 2002/0138602 A1 | 9/2002 | Vinberg | |
| 2003/0069671 A1* | 4/2003 | Yashiki et al. | 701/1 |
| 2003/0131093 A1 | 7/2003 | Aschen et al. | |
| 2003/0188007 A1* | 10/2003 | Unger | 709/232 |
| 2003/0227451 A1 | 12/2003 | Chang | |
| 2004/0128414 A1 | 7/2004 | Rudelic | |
| 2004/0190877 A1 | 9/2004 | Matsuno et al. | |
| 2004/0228197 A1 | 11/2004 | Mokhlesi | |
| 2004/0246841 A1* | 12/2004 | Miyamoto | 369/47.28 |
| 2004/0260967 A1 | 12/2004 | Guha et al. | |
| 2005/0036387 A1 | 2/2005 | Seal et al. | |
| 2005/0044454 A1 | 2/2005 | Moshayedi | |
| 2005/0047396 A1* | 3/2005 | Helm et al. | 370/352 |
| 2005/0197017 A1 | 9/2005 | Chou et al. | |
| 2005/0268007 A1 | 12/2005 | Nakabayashi | |
| 2005/0281112 A1 | 12/2005 | Ito et al. | |
| 2006/0056813 A1 | 3/2006 | Sutardja | |
| 2006/0085670 A1 | 4/2006 | Carver et al. | |
| 2006/0085836 A1 | 4/2006 | Lyons, Jr. et al. | |
| 2006/0095647 A1 | 5/2006 | Battaglia et al. | |
| 2006/0159098 A1* | 7/2006 | Munson et al. | 370/394 |
| 2006/0248387 A1* | 11/2006 | Nicholson et al. | 714/22 |
| 2006/0282709 A1 | 12/2006 | Shu et al. | |
| 2007/0008186 A1 | 1/2007 | Michaels et al. | |
| 2007/0053513 A1 | 3/2007 | Hoffberg | |
| 2007/0073944 A1 | 3/2007 | Gormley | |
| 2007/0124130 A1 | 5/2007 | Brunet et al. | |
| 2007/0124542 A1* | 5/2007 | Ven | 711/143 |
| 2007/0159710 A1 | 7/2007 | Lucas et al. | |
| 2007/0180328 A1 | 8/2007 | Cornwell et al. | |
| 2007/0201814 A1 | 8/2007 | Yamauchi | |
| 2007/0260811 A1 | 11/2007 | Merry, Jr. et al. | |
| 2007/0266200 A1 | 11/2007 | Gorobets et al. | |
| 2007/0268791 A1 | 11/2007 | Grow et al. | |
| 2008/0046766 A1 | 2/2008 | Chieu et al. | |
| 2008/0109591 A1 | 5/2008 | Kim et al. | |
| 2009/0037643 A1 | 2/2009 | Ohtsuka et al. | |
| 2009/0063895 A1 | 3/2009 | Smith | |
| 2010/0011260 A1 | 1/2010 | Nagadomi et al. | |

OTHER PUBLICATIONS

Silicondrive User's Guide, SiSMART Function, Preliminary Version 2.2 Revision A, Feb. 2005.

Webpage printed out from <http://www.m-systems.com/site/en-US/Support/DeveloperZone/Software/LifespanCalc.htm> on Jun. 13, 2006.

Webpage printed out from <http://www.m-systems.com/site/en-US/Technologies/Technology/TrueFFS_Technology.htm> on Jun. 13, 2006.

Webpage printed out from <http://www.techworld.com/storage/features/index.cfm?FeatureID=498> on Jun. 13, 2006.

International Search Report and Written Opinion for International Application No. PCT/US08/052358; Dated May 5, 2008 in 11 pages.

International Search Report and Written Opinion for International Application No. PCT/US07/068490; Dated Sep. 29, 2008 in 11 pages.

International Search Report and Written Opinion for International Application No. PCT/US09/032984; mailed on Mar. 17, 2009, in 10 pages.

International Search Report and Written Opinion for International Application No. PCT/US09/033262; mailed on Mar. 25, 2009, in 11 pages.

Office Action dated Jan. 28, 2009 received in related U.S. App. No. 11/429,936 in 23 pages.

Office Action dated Oct. 31, 2008 received in U.S. Appl. No. 11/672,435 in 32 pages.

Notice of Allowance dated Jun. 1, 2009 received in U.S. Appl. No. 11/672,435 in 9 pages.

SFF Committee Specification, "Self-Monitoring, Analysis and Reporting Technology (SMART) SFF-8035i Revision 2.0", Apr. 1, 1996.

European Search Report dated Dec. 29, 2011 received in Application No. 08714110.7 in 7 pages.

* cited by examiner

STORAGE SUBSYSTEM WITH CONFIGURABLE BUFFER

CROSS REFERENCE TO RELATED APPLICATION

This application is a continuation of and claims priority benefit under 35 U.S.C. §120 from U.S. patent application Ser. No. 11/672,435, filed Feb. 7, 2007, which is incorporated by reference herein in its entirety.

BACKGROUND

1. Field of the Invention

The present invention relates to storage subsystems. More specifically, the present invention relates to buffers used to transfer data between a host computer system and a storage subsystem.

2. Description of the Related Art

With increasing memory capacity, a mixture of information (e.g., program files, setup files, user data, etc.) can be conveniently stored on a single storage subsystem such as an advanced technology attachment (ATA) flash disk or a removable flash memory card. Data is commonly transferred to the storage subsystem from a host system through the use of a buffer, which temporarily stores the data while it is being written to non-volatile storage. The buffer uses volatile memory that is faster than the non-volatile storage of the subsystem, enabling the subsystem to receive write data at a transfer rate that exceeds the write speed of the non-volatile storage. If power is lost after the host finishes writing to the subsystem but before the data is fully written to non-volatile storage, the host may treat the write operation as successful, even though it is not.

The mixture of information written to a storage subsystem through the buffer may include critical data, such as financial data or executable files. Reliability of the transfer in these situations is typically more important than the speed of the transfer. On the other hand, when the storage subsystem is used to transfer and store non-critical data such as video and audio data, performance is typically critical. Unfortunately, existing storage subsystems do not provide an efficient and effective mechanism for managing the tradeoff between performance and the risk of data loss.

SUMMARY

A storage subsystem is disclosed that includes a variable-size write buffer that temporarily stores write data received from a host system as such data written to the subsystem's non-volatile storage. The storage subsystem is capable of adjusting the size of the write buffer so as to vary both the performance (e.g., sustained write speed) of the storage subsystem and the risk of data loss. In one embodiment, the storage subsystem implements a command set that enables the host system to directly control the size of the write buffer. Thus, for example, the host system may set the write buffer to a relatively large size (to optimize performance) when transferring non-critical data, and to a relatively small size (to reduce the risk of data loss) when transferring mission critical data. The storage subsystem may additionally or alternatively be capable of adjusting the size of the write buffer based on monitored operating conditions, such as the temperature, the stability/consistency of a power signal received from the host system, and/or the elapsed time since the storage subsystem was last powered up. The storage subsystem may be implemented as a memory card or drive that plugs into a slot, or attaches to an external or internal port, of the host system.

Neither this summary nor the following detailed description purports to define the invention. The invention is defined by the claims.

BRIEF DESCRIPTION OF THE DRAWINGS

Systems and methods which embody the various features of the invention will now be described with reference to the following drawings, in which.

DETAILED DESCRIPTION OF SPECIFIC EMBODIMENTS

The following description is intended to illustrate specific embodiments of the invention, and not to limit the invention. Thus, nothing in this detailed description is intended to imply that any particular feature, characteristic or component is essential to the invention. The invention is defined only by the claims.

I. Overview

Figure 1:
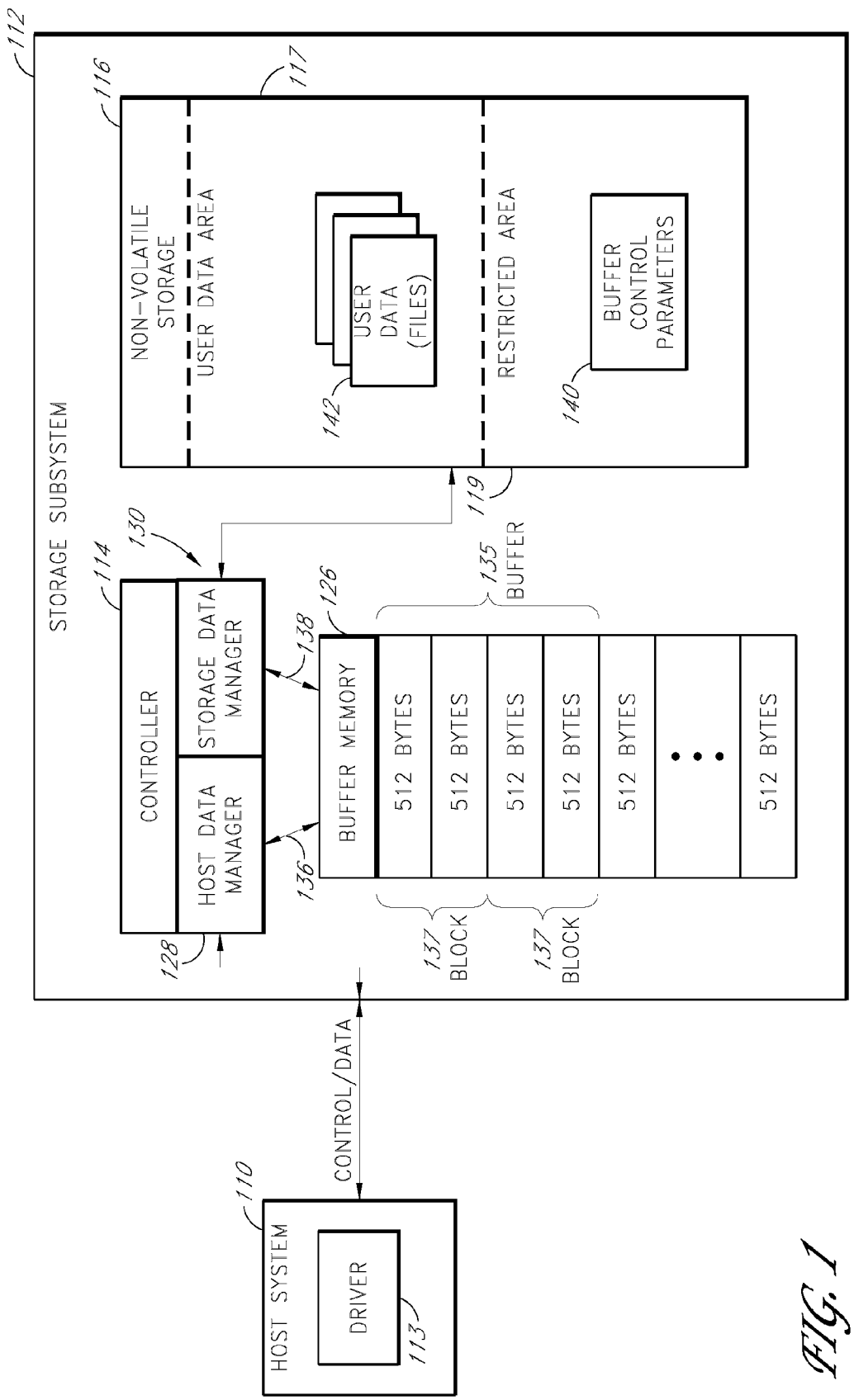
FIG. 1 is a block diagram illustrating a host system linked to a storage subsystem with a configurable write buffer according to one embodiment of the invention.

FIG. 1 is a block diagram illustrating a host system 110 connected to a storage subsystem 112 with a programmable/configurable buffer memory 126 according to one embodiment of the invention. The host system 110 may, for example, be a portable computer, a workstation, a router, a blade server, a military system, a flight computer, or any other type of computing device. The host system 110 stores data on the storage subsystem 112, and may provide operating system functionality and a boot process for the storage subsystem 112. The host system 110 executes a driver program 113 that provides functionality for communicating with the storage subsystem 112, such as by issuing commands in accordance with an ATA or other standard. In certain embodiments, the driver 113 may communicate with, or be part of, one or more software applications that are specifically configured to use the storage subsystem 112. The storage subsystem 112 may be in the form of a detachable device, such as a solid-state memory card that plugs into a slot or external port of the host system 110 and complies with one or more of the following specifications: CompactFlash, PCMCIA, SmartMedia, MultiMediaCard, SecureDigital, Memory Stick, ATA/ATAPI, PCI Express, PCI Mezzanine Card, and AdvancedTCA Mezzanine Card.

The storage subsystem 112 comprises a controller 114, a buffer memory 126, and non-volatile storage 116. Although shown as separate blocks in FIG. 1, the buffer memory 126 may be internal to, or part of the same integrated circuit as, the controller 114. The buffer memory 126 is implemented using an array of volatile solid-state memory devices, such as static random access memory devices. The non-volatile storage 116 is preferably implemented using solid-state memory devices, but may additionally or alternatively be implemented using magnetic disk drives, volatile memory devices (e.g., DRAM or SRAM) backed up by battery, or another type of storage device. The buffer memory 126 operates faster than the non-volatile storage 116, and compensates for differences in the transfer rate of data sent by host system 110 and the rate at which this data is written to the non-volatile storage 116. As illustrated, the buffer memory 126 in the illustrated embodiment is arranged into multiple 512-byte sectors, although sectors of a larger or smaller size (e.g., 128 bytes, 256 bytes, or 1024 bytes) may alternatively be used.

As is conventional, the controller 114 is configured to write data to, and read data from, the non-volatile storage 116 in response to commands from the host 110. In one embodiment, the controller 114 is an ATA flash disk controller that executes a firmware program which embodies the various buffer configuration features described herein. Some or all of the functions of the controller 114 may alternatively be fully automated in application-specific circuitry such that no firmware is needed. The controller 114 is typically implemented as a single integrated circuit device, but may alternatively comprise multiple distinct devices.

The non-volatile storage 116 is subdivided into a user data area 117 and a restricted area 119. The user data area 117 is read/write accessible via standard (e.g. ATA) access commands, and is used by the controller 114 to implement a conventional file system (e.g., FAT16 or FAT32). Thus, the user data area 117 is available to host applications and the host operating system to store files 142. The restricted memory area 119 is preferably accessible only via one or more non-standard or "vendor-specific" commands, and thus is not exposed to the host's operating system and applications. Stated differently, the standard memory access command codes used to access the subsystem's user data memory area 117 do not provide access to the restricted area 119. As described below, the restricted area 119 is used to store configuration and control information, including information regarding the current configuration of the buffer memory 126. In other embodiments of the invention, the restricted memory area 119 may be omitted; for example, the restricted memory area may be replaced by an internal magnetic disk drive.

In the illustrated embodiment, the buffer memory 126 has two read/write ports 136 and 138 to efficiently move data between the host system 116 and the non-volatile storage 116. The ports 136 and 138 provide data channels between the buffer memory 126 and data management portions 128 and 130 of the subsystem's controller 114. Additional read/write ports may be included; for example, a quad port SRAM may be used. In the embodiment shown, the controller 114 includes a host data manager 128 responsible for moving data to and from the host 110. The host data manager 128 accesses the buffer memory 126 via one of the read/write ports 136. The controller 114 also includes a storage data manager 130 responsible for moving data to and from the non-volatile storage 116 via the other read/write port 138. The storage data manager 130 may also be configured for striping data across the non-volatile storage 116 or sending the data across multiple storage read/write ports. The host data manager 128 and storage data manager 130 may be implemented in state machine logic.

In some embodiments, the controller 114 may also use the buffer memory 126 to implement a read buffer during read operations from the host. Alternatively, a separate, dedicated read buffer may be provided.

During a write operation, the controller 114 initially writes the data received from the host 110 to the buffer memory 126, and then moves this data from the buffer memory 126 to the non-volatile storage 116. Because the buffer memory 126 has at least two ports, the controller 114 can write to one block of the buffer memory 126 while moving data from another block of the buffer memory 126 to the non-volatile storage 116. If no buffer memory is currently available, the controller 114 asserts a BUSY signal to the host 110 to prevent the host from sending additional write data. Thus, the controller 114 uses the BUSY signal to regulate the rate at which write data is received from the host 110.

In accordance with the invention, the controller 114 is capable of adjusting the amount of buffer memory 126 that is available to buffer write data. This is preferably accomplished by adjusting the size of a write buffer 135 implemented in the buffer memory 126. For example, to maximize the sustained rate at which data is written to the storage subsystem 112, the controller 114 can set the write buffer 135 to its maximum size, so that most or all of the buffer memory 126 is available for buffering write data. This setting optimizes performance, but increases the risk of data loss by increasing the amount of uncommitted data that can be stored in the volatile buffer memory 126 at a time. ("Uncommitted data" refers to write data that has not yet been written from the buffer memory to the subsystem's non-volatile storage 116; such data is ordinarily lost from the storage subsystem if power is lost.) Thus, to reduce the risk of data loss (at the expense of a reduced sustained data transfer rate), the controller 114 can set the buffer size to be less than its maximum size.

In the preferred embodiment, the controller 114 adjusts the buffer size in response to special (non-standard) commands received from the host system 110. Specifically, the storage subsystem 112 implements a vendor-specific command that enables the host 110 to specify the buffer size in terms of the number of 512-byte sectors it includes. For instance, if the buffer memory 126 has sixteen sectors that can be used for buffering write data, there will be sixteen possible settings (1, 2, 3 . . . 16 sectors) for the buffer size. In other embodiments, the size of the write buffer may be specified in terms of a number of bytes, an address range, a set of address ranges, or some other measure. Further, as mentioned above, sectors of a different size may be used.

Thus, for example, when writing relatively important data to the storage subsystem 112, the host 110 may set the buffer size to a relatively small value. By doing so, the host can place an upper limit on the amount of uncommitted write data stored in the write buffer 135 at a time, and can thus limit the amount of data that will be lost if a power loss or other failure occurs. For other types of data, such as video or audio streams, the host may make the write buffer relatively large to maximize throughput.

As discussed below, in some embodiments, the controller 114 may additionally or alternatively adjust the buffer size based on monitored operating conditions, such as the temperature of the storage subsystem 112, the stability of the power signal received from the host 110, and/or the frequency with which ECC errors are detected. Thus, in some embodiments, the storage subsystem 112 may not enable the host 110 to control the size of the buffer.

In the preferred embodiment, the storage subsystem's command set also enables the host 110 to effectively subdivide the write buffer 135 into multiple equal-size blocks 137. Each block preferably consists of a whole number of 512-byte sectors. For example, if the buffer size is set to eight and the block size is set to two, the write buffer will be subdivided into four blocks, each of which consists of two sectors. In the example configuration shown in FIG. 1, the buffer size is set to four sectors, and the block size is two.

When or shortly after a block 137 becomes full during a write operation, the controller 114 begins moving its contents to non-volatile storage 116. If the write buffer 135 consists of a single block (i.e., the block size is equal to the buffer size), the controller asserts the BUSY signal during this move operation so that no additional write data is received from the host until the move is complete. On the other hand, if the write buffer 135 contains multiple blocks 137, the storage subsystem/controller can receive write data into one block while moving write data from another block to non-volatile storage 116.

The controller 114 preferably writes data to the blocks 137, and moves data from the blocks, in a circular fashion. The allocation of write data to particular blocks 137 occurs transparently to the host. Setting the block size to a relatively small value (e.g., one sector) generally reduces the delay between the receipt of data into the write buffer 135 and the movement of such data to non-volatile storage 116. Setting the block size to a relatively large value generally reduces the data transfer delay between the host system 110 and the receipt of data into the write buffer 135.

The storage subsystem 112 may alternatively be implemented without subdividing the write buffer 135 into multiple blocks. In addition, the storage subsystem can be implemented such that the number of blocks, and/or the size of each block, is fixed.

The controller 114 preferably implements multiple modes of operation that define how the buffer size, or the buffer size and block size, can be varied. These modes may, for example, include Automatic Mode, Host Set Mode, and Monitor Mode, as discussed below, although these particular modes are not required. The host system 110 can place the storage subsystem into a desired mode using a vendor-specific command.

As illustrated, the restricted memory area 119 of the storage subsystem 112 preferably stores buffer control parameters 140 that indicate the current configuration of the write buffer, including, e.g., the buffer size and block size settings and/or the current mode setting. This enables the controller 114 to restore these settings when the subsystem 112 is powered up. The controller 114 may also effectively cache the buffer control parameters in its register storage. In one embodiment, the control parameters 140 are stored in a restricted 512-byte block of the non-volatile storage 116 in a preconfigured location and format known to the controller 114. The host system 110 may execute software, such as the driver 113, that is configured to use the appropriate vendor-specific command or commands to control the configuration of the write buffer 135 and the associated mode of operation.

The restricted memory area 119 may also be used by the controller 114 to store other types of control information. For example the restricted memory area 119 may store firmware executed by the controller 114, security information for controlling access to the user data area 117, and/or wear level data reflective of the wear level of each sector of the non-volatile storage 116.

Figure 2:
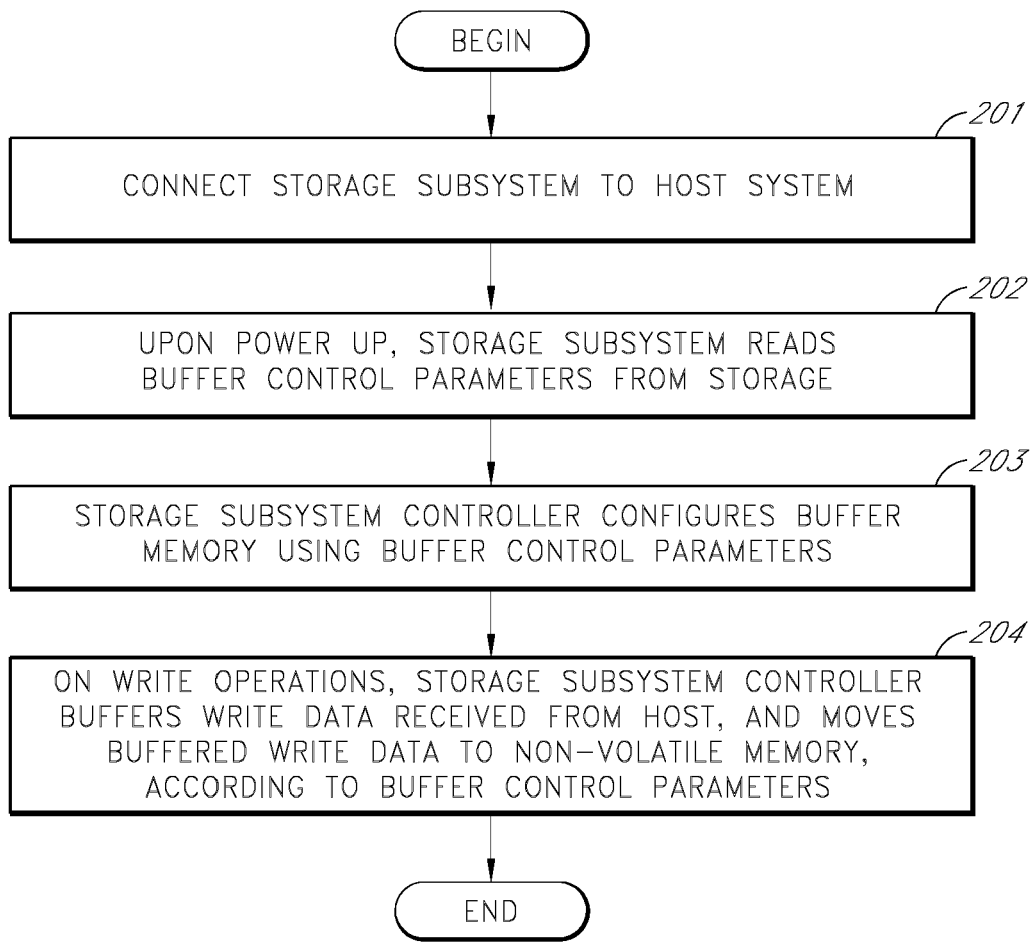
FIG. 2 illustrates a power-up sequence implemented by the storage subsystem.

FIG. 2 is a flow chart illustrating generally how the storage subsystem 112 configures and uses the buffer memory 126 when connected to a host 110. First, in step 201, a subsystem 112 containing buffer control parameters 140 in its restricted memory area 119 is connected to a host system 110. For example, if the subsystem 112 is a USB-based flash memory drive, the flash drive may be connected to a USB port of the host system 110. Next, in step 202, when the storage subsystem 112 powers up, the controller 114 reads the buffer control parameters 140 from the non-volatile storage 116. The controller 114 thereafter maintains the retrieved buffer control parameters 140 in volatile register storage, and uses the buffer memory 126 to cache write data in accordance with these settings.

II. Modes

This section describes one example of a set of modes that may be implemented by the storage subsystem 112 to flexibly control how the buffer memory 126 is configured and used. As will be recognized, the subsystem 112 can be implemented without these modes.

Automatic Mode

When in Automatic Mode, the controller 114 automatically adjusts the block size (transparently to the host) based on the transfer command received from the host system 110. The storage subsystem 112 may thus advantageously internally adjust the block size to increase the speed of the data transfer between the host system 110 and the storage subsystem 112, and to optimize the data transfer rate/data integrity tradeoff accordingly.

More specifically, if the host uses a conventional Sector Count Register value to specify the transfer size, the controller 114 may use this value to select the appropriate block size for the transfer. For instance, if the Sector Count Register field is set to "02h" in the command, the controller 114 would use a block size of two. If, however, the host write command indicates a transfer of six sectors (e.g. the Sector Count Register field is "06h"), the controller 114 would set the block size to six sectors. The controller may also appropriately adjust the buffer size to accommodate the changes in block size.

Host Set Mode

Using the Host Set Mode, the host system 110 can set or change the buffer size and block size. The host system 110 may, for example, adjust these parameters based on the conditions surrounding the host system 110, such as the criticality of the data being stored and/or the susceptibility of the subsystem 112 to power loss or other failure. As one example of how susceptibility to failure can be used, the host 110 may maintain a log of events in which the subsystem 112 is connected and disconnected. The host may then use this log to calculate a probability that the subsystem will be disconnected from the host during a write operation, and may use this probability value to configure the buffer so as to stay within a pre-specified risk level.

The storage subsystem 112 may be placed in the Host Set Mode using a vendor-specific command that includes a first field to designate the buffer mode, and which includes two additional fields that specify the buffer size and block size, respectfully, when the Host Set Mode is specified by the first field. These settings are recorded persistently via the buffer control parameters 140, and are used until changed via another vendor-specific command.

By way of example, suppose that the host issues a write command with the Sector Count Register field set to "04h," and the storage subsystem 112 is operating in the Host Set Mode. If the block size is set to two and the buffer size is set to four or more, the subsystem will use two 2-sector blocks to handle the transfer. If, on the other hand, both the block size and the buffer size are set to two, the subsystem will use a 2-sector block to handle the first half of the transfer, and will then use the same 2-sector block to handle the second half of the transfer.

The Host Set Mode may be used to manage the risk of data loss. For example, in a heart monitoring log application, the subsystem 112 may store heart monitoring data from a heart monitoring host system 110, and that data may be read and analyzed by a separate personal computer system (not shown). With the surrounding conditions of battery operation, possibility of power loss, and the transfer of critical data, the host system 110 may set the buffer size to one sector so that the amount of uncommitted heart monitoring data in the write buffer at any give time will be relatively small. When heart monitor logging is completed, the storage subsystem 112 may then be connected to the personal computer system for data analysis. The new conditions surrounding the personal computer system are typically a low probability of data loss, mostly read operations with very few write operations, and large amounts of data being read. Consequently, the host may increase the size of the write buffer to enable writes to occur at higher speeds.

Monitor Mode

When in the Monitor Mode, the subsystem's controller 114 can automatically adjust the buffer parameters based on data reflective of whether a power loss or other failure will likely occur. For example, the controller 114 may select the appropriate buffer size (and optionally block size) based on any one or more of the following: (a) the temperature of the storage subsystem, (b) the length of time that the subsystem 112 has been powered up, (c) the average length of time that the subsystem 112 remains powered up; (d) the length of time since the last power signal anomaly was detected, (e) the percentage of time in which the power signal has been anomalous since the last power-up; (f) the percentage of time spent executing write operations since the last power-up; (g) the percentage of sectors in which ECC errors have been detected on read operations, (h) the output of an internal shock or vibration sensor, (i) usage statistics reflective of the wear state, and thus the expected remaining life, of the non-volatile memory array, as generated, e.g., as described in U.S. patent appl. Ser. No. 11/429,936, filed May 8, 2006, the disclosure of which is hereby incorporated by reference. The controller 114 may maintain these and other types of data in the restricted memory area 119, and may analyze the collected data to predict likelihoods of failure. When the risk of a failure is relatively high, a relatively small buffer size may be used. When the risk of a failure is relatively low, a relatively large buffer size may be used.

Figure 3:
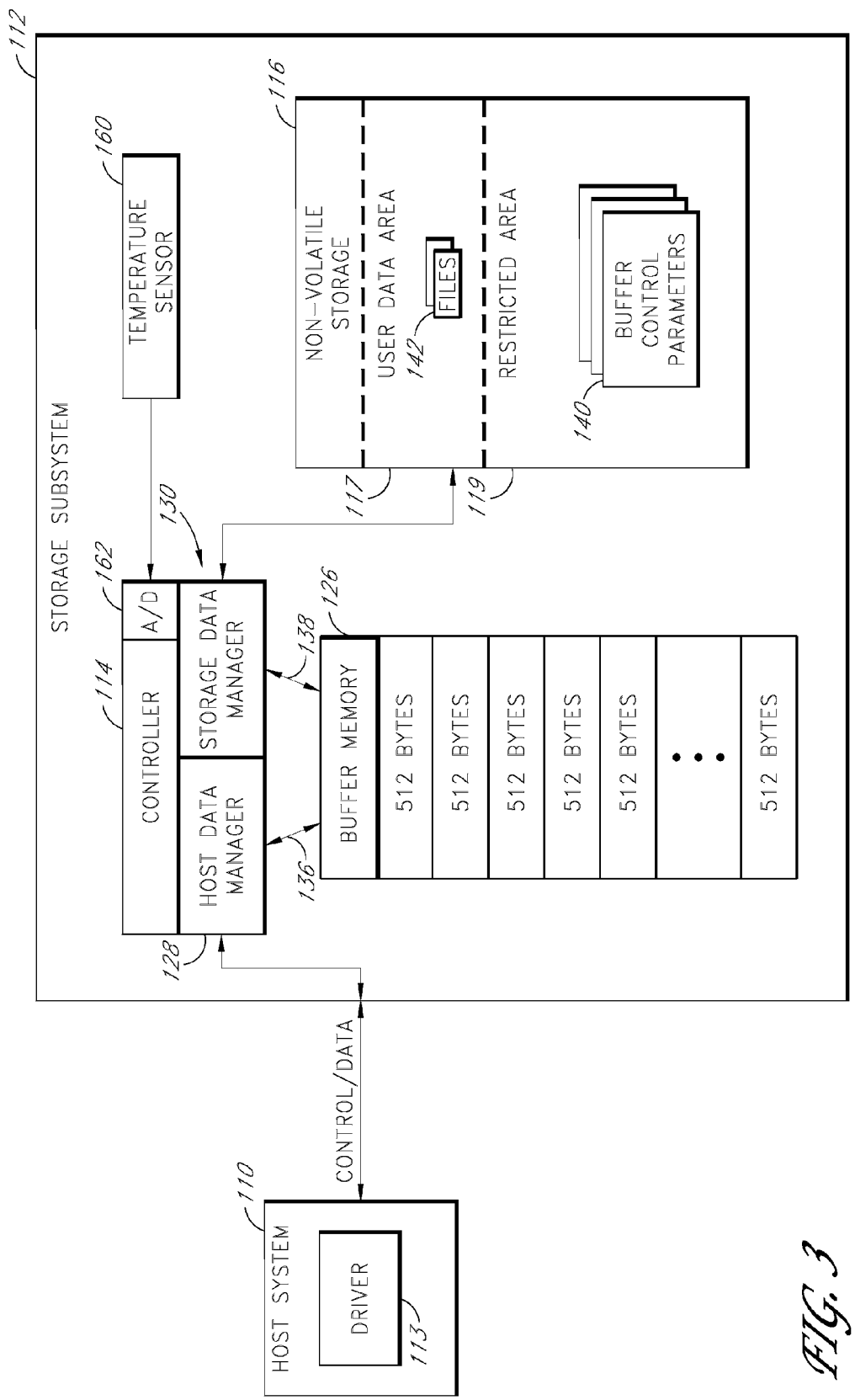
FIG. 3 illustrates an embodiment in which the storage subsystem includes a temperature sensor that is used to configure the buffer.

For example, as depicted in FIG. 3, the controller 114 may adjust the buffer size based partly or wholly on temperature readings taken from a temperature sensor 160 incorporated into the subsystem 112. The temperature sensor 160 may be connected to an analog-to-digital converter 162 of the controller 114 as shown, or to an external analog-to-digital converter. The subsystem controller 114 may, for example, decrease the buffer size when the temperature of the storage subsystem 112 exceeds 80 degrees Celsius, which may be indicative of an increased likelihood of system failure.

As another example, the controller 114 may monitor power conditions, and may adjust the buffer size based on power supply noise or level thresholds indicative of potential power loss. For example, the controller 114 may decrease the buffer size when the power supply noise measurements exceed 100 mV, or when the power signal drops below some threshold.

As another example, in some embodiments the storage subsystem 112 may include a battery that is used as a backup power source such that write operations can be completed if power from the host is lost. In these embodiments, the controller 114 may adjust the buffer size based on the charge status of the battery. For example, the controller 114 may decrease the buffer size when the battery's charge level falls below a selected threshold.

As yet another example, the storage subsystem 112 may adjust the buffer size to match the cluster size (the minimum size block of data that a file system can write) of the host system data partition for optimized synchronization with the host system's 110 file system. Specifically, the controller 114 may read the formatted partition information of the host system to determine the cluster size value, and then set the buffer size of the subsystem accordingly. For example, the if the cluster size of a host system 110 drive is 4096 bytes, then the controller 114 may set the buffer size to eight sectors, or 4096 (=8×512) bytes.

In other embodiments, the controller 114 may adjust the buffer size based on a combination of environmental and system variables. For example, the controller 114 may decrease the buffer size when the temperature increases beyond a given threshold, the power supply noise exceeds a given threshold, or both the temperature and power supply noise exceed some lower thresholds. Further, the controller 114 may use a number of different factors (such as those enumerated above) to calculate a probability of power loss, and may then use this probability value to select an appropriate buffer size.

III. Physical Construction and Configuration

Some additional details of specific embodiments of the storage subsystem 112 will now be described with reference to FIG. 1. As mentioned above, the storage subsystem 112 may be a solid-state memory card or drive that plugs into a slot or port of the host system 110, and may comply with one of the following card specifications: CompactFlash, PCM-CIA, SmartMedia, MultiMediaCard, SecureDigital, Memory Stick, ATA/ATAPI, PCI Express, PCI Mezzanine Card, and AdvancedTCA Mezzanine Card. The storage subsystem 112 may also have a housing and signal interface that complies with one of the following specifications: sub 1 inch hard disk drive, 1.8 inch hard disk drive, 2.5 inch hard disk drive and 3.5 inch hard disk drive. A custom form factor and/or signal interface may alternatively be used. Although the storage subsystem 112 typically includes a physical connector for attaching to the host 110, the storage subsystem 112 may alternatively communication with the host via a wireless interface such as Bluetooth or IEEE-802.11.

In one embodiment, the controller 114 comprises an ATA flash disk controller that executes firmware. The firmware executed by the controller 114 embodies functionality for implementing the features described herein, including providing access to the restricted memory area 119 via vendor-specific commands. The controller 114 may alternatively be implemented in-whole or in-part as an ASIC, FPGA, or other device, which may but need not execute firmware.

The non-volatile storage 116 may, but need not, be implemented using NAND memory components. The non-volatile storage 116 may comprise a plurality of solid-state storage devices coupled to the controller 114. The non-volatile storage 116 may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid-state storage devices may be physically divided into blocks, pages and sectors, as is known in the art. As mentioned above, other forms of non-volatile storage (e.g., battery backed-up volatile DRAM or SRAM devices, magnetic disk drives, etc.) may additionally or alternatively be used.

All possible combinations of the various features and characteristics described herein are contemplated, and are intended to fall within the scope of this disclosure.

The foregoing embodiments have been presented by way of example only, and are not intended to be limiting. Indeed, the novel features described herein may be embodied in a variety of other forms, including forms that do not provide all of the benefits described herein. Furthermore, various omissions, substitutions and changes in the form of the disclosed features may be made without departing from the invention, which is defined by the accompanying claims.

What is claimed is:

1. A storage subsystem, comprising:
a controller coupled to non-volatile storage, the controller capable of writing data to, and reading data from, the non-volatile storage in response to commands received by the storage subsystem from a host system; and
a buffer memory, the buffer memory capable of receiving data at a higher rate than the non-volatile storage,
wherein the controller is configured to implement a write buffer in the buffer memory to buffer write data received from the host system and transfer the write data from the write buffer to the non-volatile storage, and to automatically adjust a size of the write buffer based at least in part on one or more monitored conditions of the storage subsystem that are reflective of a likelihood of a data loss in the storage subsystem, the automatically adjusting including reducing the size of the write buffer between at least a first non-zero size value and a second non-zero size value in response to the one or more monitored conditions indicating an increased risk of data loss, so as to vary both a sustained write speed of the storage subsystem and a risk of data loss.

2. The storage subsystem of claim 1, wherein the one or more monitored conditions comprise a temperature reading of the storage subsystem obtained from a temperature sensor.

3. The storage subsystem of claim 1, wherein the storage subsystem further comprises a backup power source and the one or more monitored conditions comprise a charge level of the backup power source.

4. The storage subsystem of claim 1, wherein the one or more monitored conditions comprise at least one of:
a length of time that the storage subsystem has been powered up; and
an average length of time that the storage subsystem has remained powered up.

5. The storage subsystem of claim 1, wherein the one or more monitored conditions comprise at least one of:
a length of time since a power signal anomaly has been detected; and
a percentage of time in which a power signal from the host system has been anomalous since a last power-up.

6. The storage subsystem of claim 1, wherein the one or more monitored conditions comprise a percentage of time the storage subsystem spent in executing write operations since a last power-up.

7. The storage subsystem of claim 1, wherein the one or more monitored conditions comprise information regarding a number of sectors in which ECC errors have been detected in read operations of the non-volatile storage.

8. The storage subsystem of claim 1, wherein the storage subsystem further comprises a vibration sensor and the one or more monitored conditions comprise an output of the vibration sensor.

9. The storage subsystem of claim 1, wherein the non-volatile storage further comprises a restricted area configured to store configuration data for the controller to configure the buffer memory.

10. The storage subsystem of claim 1, in combination with the host system, wherein the host system is configured to cause the controller to vary the size of the write buffer based on a calculated probability of failure based on events logged by the host system.

11. The storage subsystem of claim 1, wherein the non-volatile storage comprises non-volatile solid state memory devices.

12. The storage subsystem of claim 1, wherein the reduction in buffer size reduces the risk of data loss by reducing an amount of time elapsed before data in the write buffer is written to the non-volatile storage.

13. A method performed by a storage subsystem to handle write operations, the method comprising:
receiving write data from a host system, and storing the write data in a variable-size write buffer implemented in a volatile memory of the storage subsystem;
moving the write data from the write buffer to non-volatile storage of the storage subsystem, and signaling to the host system when the write buffer is available to receive additional write data; and
automatically adjusting a size of the write buffer over time based at least in part on one or more monitored conditions of the storage subsystem that are reflective of a likelihood of a data loss in the storage subsystem, so as to vary a sustained write speed of the storage subsystem and an associated risk of data loss, the automatically adjusting comprising reducing the size of the write buffer between at least a first non-zero size value and a second non-zero size value in response to the one or more monitored conditions indicating an increased risk of data loss.

14. The method of claim 13, wherein the one or more monitored conditions comprise a temperature reading.

15. The method of claim 13, wherein the one or more monitored conditions comprise a consistency of a power signal received from the host system.

16. The method of claim 13, wherein the one or more monitored conditions comprise an elapsed time since the storage subsystem was last powered up.

17. The method of claim 13, wherein the one or more monitored conditions comprise an output of a vibration sensor.

18. The method of claim 13, wherein the one or more monitored conditions comprise data regarding a current wear level of the non-volatile storage.

19. The method of claim 13, wherein the storing the write data in the write buffer and the moving the write data from the write buffer to non-volatile storage occur simultaneously.

20. The method of claim 13, wherein the reduction in buffer size reduces the risk of data loss by reducing an amount of time elapsed before write data in the write buffer is written to the non-volatile storage.

* * * * *